United States Patent [19]
DelRosario et al.

[11] Patent Number: 5,474,850
[45] Date of Patent: Dec. 12, 1995

[54] METAL OXIDE FREE FLUOROELASTOMER FUSING MEMBER CONTAINING SAME

[75] Inventors: Chris F. DelRosario, Demarest, N.J.; James A. Lentz, Arlington, Va.

[73] Assignee: Ames Rubber Corporation, Hamburg, N.J.

[21] Appl. No.: 269,353

[22] Filed: Jun. 30, 1994

Related U.S. Application Data

[62] Division of Ser. No. 887,454, May 22, 1992, abandoned.

[51] Int. Cl.⁶ ..................................................... B32B 27/00
[52] U.S. Cl. .......................... 428/421; 428/447; 428/448; 428/457; 428/906; 355/284; 219/216; 430/98; 430/99; 430/124; 492/53; 492/56
[58] Field of Search ................................. 428/421, 447, 428/448, 457, 906; 219/216; 430/98, 99, 124; 355/284; 526/254; 492/53.56

[56] References Cited

U.S. PATENT DOCUMENTS

| | | | |
|---|---|---|---|
| 2,793,200 | 5/1957 | West | 525/326.3 |
| 2,951,832 | 9/1960 | Moran | 525/326.3 |
| 3,039,992 | 6/1962 | Smith | 525/326.3 |
| 3,243,411 | 3/1966 | Tawney et al. | 525/326.3 |
| 3,502,628 | 3/1970 | Barney et al. | 525/326.3 |
| 3,622,549 | 8/1969 | Keller et al. | 260/80.77 |
| 3,674,763 | 7/1972 | Nakamura et al. | 260/87.7 |
| 4,257,699 | 3/1981 | Lentz | 430/99 |
| 4,264,181 | 4/1981 | Lentz et al. | 355/284 |
| 4,272,179 | 6/1981 | Seanor | 219/216 |
| 4,430,406 | 2/1984 | Newkirk et al. | 430/99 |
| 4,487,878 | 12/1984 | Vasta | 525/326.3 |
| 4,490,501 | 12/1984 | Vasta | 525/326.3 |
| 4,495,248 | 1/1985 | Vasta | 525/326.3 |
| 4,501,482 | 2/1985 | Stryjewski | 355/350 |
| 4,763,158 | 8/1988 | Schlueter et al. | 430/99 |
| 4,830,920 | 5/1989 | Hayashi et al. | 428/421 |
| 4,853,737 | 8/1989 | Hartley et al. | 430/99 |
| 4,935,785 | 6/1990 | Wildi et al. | 430/124 |
| 4,985,520 | 1/1991 | Hayashi et al. | 526/254 |
| 5,035,950 | 7/1991 | DelRosario | 428/421 |

FOREIGN PATENT DOCUMENTS

| | | | |
|---|---|---|---|
| 018140 | 10/1980 | European Pat. Off. | |
| 0186180 | 7/1986 | European Pat. Off. | 526/254 |
| 0332438 | 9/1989 | European Pat. Off. | |
| 0455470 | 6/1991 | European Pat. Off. | |
| 0441645 | 8/1991 | European Pat. Off. | |
| 1960762 | 6/1970 | Germany. | |
| 199015 | 9/1985 | Japan. | |
| 240146 | 10/1975 | U.S.S.R. | 525/326.3 |
| 1161410 | 5/1969 | United Kingdom. | |

OTHER PUBLICATIONS

*Chemical Abstracts*, vol. 81, No. 18, 4 Nov. 1974, Columbus, Ohio, Ukai, Shinji 'Fluorine Containing Rubber Composition', p. 80, column 1.

*Chemical Abstracts*, vol. 81, No. 26, 30 Dec. 1974, Columbus, Ohio, Kometani, Yutani, Yutaki 'Vulcanization of Fluoropolymers', p. 77, col. 2.

*Chemical Abstracts*, vol. 81, No. 16, 21 Oct. 1974, Columbus, Ohio, Kometani Yutaki Fluoroelastimers with Low Permanent Set, p. 60, col. 2.

*Primary Examiner*—Patrick J. Ryan
*Assistant Examiner*—William A. Krynski
*Attorney, Agent, or Firm*—Cowan, Liebowitz & Latman

[57] ABSTRACT

A fluoroelastomer composition free of metal or metal containing compounds, such as metal, metal alloys, metal salts or metal oxide suitable for the upper layer of a fuser roll which does not require the use of mercapto functional active release agents to prevent offset is provided. The fluoroelastomer compositions contain at least 23.4 mole percent hexafluoropropylene. They can be cured by electron beam treatment, fugitive base treatment or by the use of blocked/hindered bases.

10 Claims, 1 Drawing Sheet

1

METAL OXIDE FREE FLUOROELASTOMER FUSING MEMBER CONTAINING SAME

This is a divisional of application Ser. No. 08/887,454, filed May 22, 1992 now abandoned.

BACKGROUND OF THE INVENTION

The invention relates generally to metal oxide free fluoroelastomer compositions and to a fusing member having an outer layer of the fluoroelastomer for applying heat and pressure to fix toner particles to recording paper.

A fuser roll is a roller designed to apply direct heat and pressure to a toner image. The fluoroelastomer surface permits toner to be fixed to the recording paper without adhering to the roller surface and can withstand continuous exposure to high temperatures, silicone oils, toners, toner additives and paper product residue without unacceptable physical degradation.

In general, when forming images by xerographic processes, an image formed of a heat fusible toner powder is selectively disposed on a web-like surface of a recording medium, such as paper, by electrostatic forces. Toner powders are commonly formed of a mixture of thermoplastic and/or thermosetting resin carriers and additives such as amorphous carbon and magnetic particles. They are conventionally fixed to the recording paper by direct contact with a fuser roll which applies pressure and heat at temperatures between about 200° to 400° F.

The fusing process is conventionally accomplished by feeding a recording medium having the toner image thereon between the nip where two mated rollers meet. One or both of the rollers are heated, typically by an internal heat source within the roller, so that the surface temperature of the roller will be above the softening point of the resinous carrier of the toner.

The recording medium with the toner image thereon is fed between the two rollers which press towards each other to apply direct heat and pressure to the toner image. The amount of pressure and the length of time that the toner is heated determines the degree of fusing. The actual temperature range suitable for fixing toner images to recording paper is referred to as the "fusing window". The fusing window, TW can be defined by the formula:

$$TW = T_{OFF} - T_{MIN}$$

wherein $T_{OFF}$ is the Hot Offset temperature and $T_{MIN}$ is the minimum fusing temperature. Hot Offset temperature is the temperature at which the cohesive forces within the molten toner layer are less than the adhesive forces between the toner and roll surface so that toner adheres to the fuser roll. $T_{MIN}$ is the minimum temperature at which toner can be acceptably fixed to the recording paper. This temperature range is dependent on the raw materials, type of toner, release agents and the pressure applied by the roller. It is important that the toner is fixed without "offset" occurring, in order to produce copies of acceptable quality. For commercial applications, a fusing window of at least 30° F. is acceptable for some applications. However, it is preferable to have as large a fusing window as possible. Thus, a 60° F. fusing window is desirable and a 100° F. fusing window is particularly ideal.

Conventional fusing systems have drawbacks. Softened toner generally has an affinity for the surface of the fuser roll it contacts. When toner adheres to the surface of a fuser roll, it can unintentionally be deposited on an unselected portion of the recording medium during the next rotation of the roll. This phenomenon is referred to as offset.

To prevent offset, a thin coating of a release agent such as polysiloxane fluid is commonly spread over the surface of the fuser roll which contacts the surface of the toner image. The polysiloxane fluid reduces the surface free energy of the roll surface and decreases the affinity of the toner for the roll. Surface tension values for several conventional fuser roll materials are set forth below in Table I.

TABLE I

| Surface Tension of Fuser Roll Materials | |
|---|---|
| Fuser Roll Surface | Surface Tension nMn |
| Polytetrafluoroethylene (PTFE) | 18.0–18.5 |
| Polyvinylidene fluoride (PVF$_2$) | 21–22 |
| Polysiloxane Compounds | 28–29 |
| Polyfluorocarbon Elastomers | 35–37 |
| Polysiloxane Release Agents | 19–21 |

When compounding or formulating fluorocarbon elastomers, metal oxides are typically included to act as an acid accepter, cure activator, reinforcing filler and/or as an additive to promote improved chemical resistance. It is believed that every commercially available fuser roll having a fluoroelastomer surface contains metal oxide particles in at least the fluoroelastomer surface layer. U.S. Pat. Nos. 4,257,699, 4,264,181 and 4,272,179 describe fuser rolls in which additional metal oxide filler particles are added to the fluoroelastomer surface material to increase the metal oxide content of the surface of the fuser rolls beyond that needed to promote cure of the material. Fluoroelastomers described in U.S. Pat. No. 5,035,950 contain only so much metal oxide as is necessary to effect cure of the high fluorine content material.

These patents describe that use of a polymer release agent having mercapto functional groups applied to the surface of a fuser roll having metal oxide filler decreases problems associated with offset. When the metal-containing filler in the elastomer surface layer is present in sufficient amount, it interacts with the polymeric release agent to produce an active release film. This active release film prevents the thermoplastic resin toner from contacting the elastomeric material itself and accordingly, offset is avoided.

Although this active release construction has proven to be commercially acceptable, it nevertheless has drawbacks. Release agent fluids having mercapto functional groups are expensive. They can also present an unpleasant odor in the office environment and interfere with the ability to write or type on the copy sheet.

Accordingly, it is desirable to provide an improved fusing system which overcomes the shortcomings of the conventional fuser systems described above.

SUMMARY OF THE INVENTION

Generally speaking, in accordance with the invention, fluoroelastomer compositions free of metal or metal containing compounds, such as metals or metal oxides, which are particularly well suited for the topcoat of a fusing member for applying heat and pressure to fix toner to a recording medium are provided. The fluoroelastomer composition can be cured by electron beam treatment, fugitive base treatment or the use of blocked/hindered amines. A fusing member having metal free fluoroelastomer surfaces have advantages over conventional fusing members because they do not require the use of expensive mercapto functional active release agents to prevent offset.

Accordingly, it is an object of the invention to provide an improved fluoroelastomer composition free of metal or metal containing compounds, such as metal oxides.

Another object of the invention is to provide an improved fuser roll having a topcoat of fluoroelastomer free of metal or metal containing compounds for fixing toner to a recording medium.

A further object of the invention is to provide a fuser roll having a metal or metal containing compound free fluoroelastomer topcoat for fusing without the need to use mercapto functional release agents.

Still other objects and advantages of the invention will in part be obvious and will in part be apparent from the specification and drawings.

The invention accordingly comprises the several steps and the relation of one or more of such steps with respect to each of the others, and the composition possessing the features, properties and the relation of constituents and the article possessing the features, properties, and the relation of elements, which are all exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1:
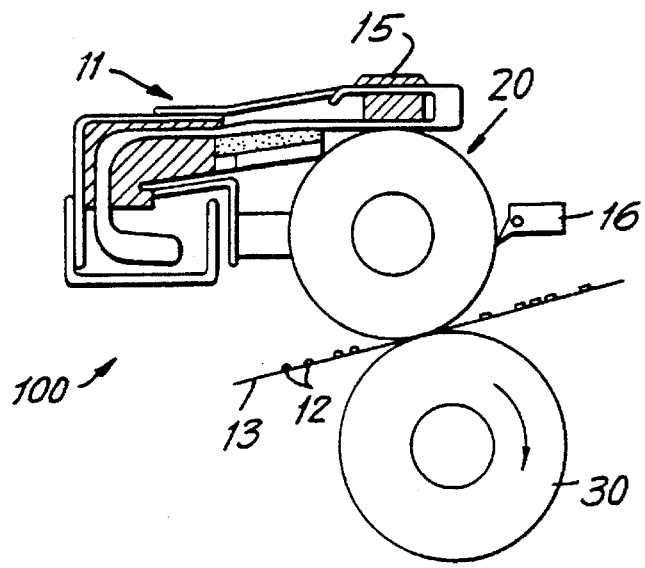
FIG. 1 is a schematic cross-sectional view of a fuser roll test assembly.

A fusing member constructed in accordance with an embodiment of the invention includes a fluoroelastomer topcoat surface that is substantially free of metal and metal containing compounds, such as metal or metal oxide particles. The fusing member can be a belt, a flat surface or another substrate having suitable shape for fixing toner images to a recording medium, such as paper, at elevated temperatures under pressure. A preferred fusing member is a fuser roll having a metal core that can be hollow, covered with the fluoroelastomer material. A heating element can be included within the metal core to heat the fluoroelastomer surface. The fuser roll can be used to fix toner powder to a recording medium, such as paper, without offset and without relying on the interaction between metal oxides and mercapto functional release agent fluids.

The outer layer of the fusing member is of a fluoroelastomer composition having a greater molar content of hexafluoropropylene (HFP) than conventional fluoroelastomers. The fluoroelastomer compositions prepared in accordance with the invention include more than about 23.4 mole % HFP and more preferably more than about 30.0 mole % HFP. A preferred composition is a copolymer of vinylidene fluoride ($VF_2$) and hexafluoropropylene (HFP) that includes more than about 69% total fluorine by weight, preferably 69 to 71% fluorine by weight. It is preferable to include as much HFP as is practical. The molar ratio of $VF_2$ to HFP is preferably less than 2 and more preferably about 1.7 or less. An acceptable preferred range is between 1.25 and 1.75.

The fluoroelastomer composition can also include cure additives, such as hexafluoropropylidine diphenol, triphenyl benzyl phosphonium chloride/bromide and acid acceptors (though not metal oxides). The effectiveness of including higher amounts of HFP than is conventional relates to the associated reduction in surface energy at the expense of other properties conventionally considered to be more important.

Fuser rolls having a fluoroelastomer surface substantially free of metal containing compounds such as metal oxides can be cured by several methods. Crosslinking can be induced by using diamines, a combination of diamines and bisphenol or by other organic base treatments such as ammonia vapor deposition. Another method involves the use of radiation curing such as electron beam treatment. Such techniques are known for the use of curing various polymer systems, but are uniformly not employed in the production of commercially available fuser rolls, where the mechanical properties of polymers having metal oxide particles therein has been the accepted material of choice. Base treatment includes the use of blocked/hindered amines, "fugitive" bases which will leave the polymer system after attack on the polymer material to yield unsaturation sites and electron beam treatment. The fugitive base treatment can be conducted in the vapor or liquid phases.

Metal oxide free curing can be accomplished with treatment by blocked/hindered amines. These include DIAK 3 (N, N'-D- Cinnamylidene-1, 6-hexanediamine and DIAK 1 (hexamethylene - diaminecarbamate) which are commercially available curing agents sold by DuPont of Wilmington, Del. This type of curing is described in Example 1.

Electron beam processing and methods for estimating the required specifications of the electron accelerator are discussed in Becker, R. C., "Accelerator Requirements For Electron Beam Processing", *Radiat. Phys. Chem.*, vol 14, Pages 353–375 (1975), the contents of which are incorporated herein by reference.

Typically, the fuser roll is conveyed into a chamber where it is bombarded by a highly energetic beam of electrons. Curing occurs during the brief interval during which the fuser roll is exposed to the electron beam, which is spread over the entire surface.

Additional details regarding electron beam processing can be obtained from Radiation Dynamics, Inc., 151 Hartland Blvd., Edgewood, N.Y. 11717. See also Cleland, M. R., et al., "High Powered DC Electronic Accelerators For Industrial Applications", RDI Technical Information Series TIS 79-6 presented at the 3rd All-Union Conference on a part accelerators, Leningrad, USSR, Jun. 26–28, 1979, the contents of which are incorporated herein by reference. Still further details can be found in Bly, J. H. "Radiation Curing of Elastomers" presented at the Education Symposium of a meeting of the Rubber Division, American Chemical Society, Philadelphia, Pa., May 3–6, 1982.

The curing of elastomeric material by Electron Beam (EB) radiation generates carbon-carbon bonds between molecules without using cure agents such as metal oxide powders. Compounding for the electron beam is similar to that for other curing processes. Commercial applications are well developed in the manufacture of wire and cable, rubber tires, heat shrink products and others. However, it is believed that this technique has never been applied to curing polymer materials for fuser rolls in the absence of conventional care system including the use of metal oxides.

Electron Beam (EB) dosages of 1–40 megarads are acceptable for many applications; 3–40 MRads is preferred and 5–20 MRads is more preferred. It is useful to include cross linking aids (co-agents) in the polymer composition at concentrations of about 1–10 parts by weight per 100 parts polymer. EB crosslinkable di or poly functional oligimers include: 1,6- Hexanediol Diacrylate, Trimethylol Propane Triacrylate, Bisphenol A Expoxy Diacrylate (EBECRYL 3700), TAC (2,4,6- Tris (Allyloxy) - S - Tri -azine and TAIC (Triallylisocyanurate).

A fuser roll test assembly 100 is shown generally in FIG. 1 and applies heat and pressure to fuse a quantity of toner particles 12 on a sheet of paper 13 between a fuser roll 20 and a pressure roll 30. Fuser roll test assembly 100 also includes a release agent application unit 11 including a wick 15 for applying release agent to the surface of fuser roll 20. A stripper finger 16 facilitates the separation of paper 13 from roll 20.

Figure 2:
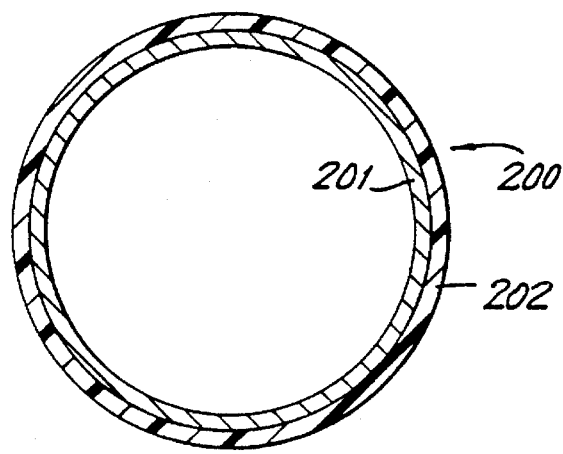
FIG. 2 is a cross-sectional view of a single layer fuser roll constructed in accordance with an embodiment of the invention.
Figure 3:
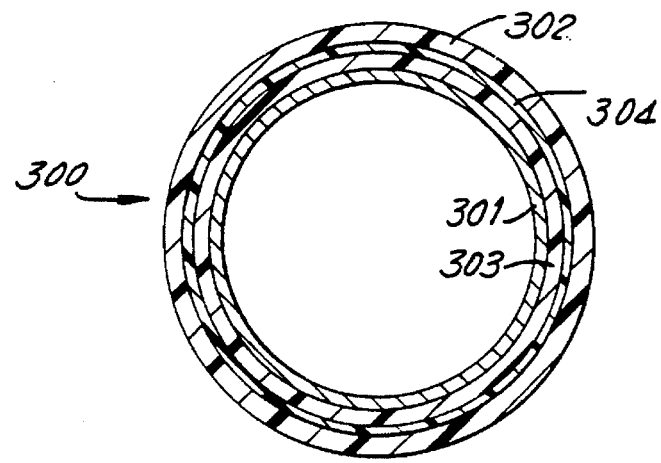
FIG. 3 is a cross-sectional view of a multi-layer fuser roll constructed in accordance with another embodiment of the invention.

FIG. 2 is a cross-sectional view of a fuser roll 200 constructed in accordance with an embodiment of the invention. Fuser roll 200 includes a hollow middle core 201 covered with a fluoroelastomer surface layer 202. A second fuser roll 300 is shown in cross-sectional view in FIG. 3. Fuser roll 300 includes an insert 302 covered with a base coat 303 having a tie coat 304 disposed thereon and a topcoat 302 disposed on tie coat 304. Base coat 303 is preferably 0.5 to 5 mil thick and the overall coating (either surface layer 202 or combined layers 303, 304, and 302) should be about 3–8 mils thick.

The following Examples describe metal and metal oxide free fluoroelastomer compositions and fuser rolls having a topcoat of the composition prepared in accordance with the invention. These examples are presented for purposes of illustration only, and are not intended to be construed in a limiting sense.

EXAMPLE 1

A series of conventional fluoroelastomer compositions and metal oxide free fluoroelastomer compositions in accordance with the invention were made. The fluoroelastomer topcoat composition of five conventional fuser rolls having metal oxide therein (A–E) and two metal oxide free fluoroelastomer topcoat fuser rolls in accordance with the invention (F and G) are shown below in Table II. Compositions A through D contain metal oxide filler conventionally used to promote interaction with a mercapto functional release agent. Composition E contains no more than sufficient residual metal oxide to act as an activator and acid accepter for conventional cross-linking of the composition, but insufficient amount to react effectively with a mercapto functional release agent.

The seven compositions A through G were prepared by mixing the components with a two roll mixing mill. The polymer was loaded between the two mill rolls to obtain a "bank". Cross-blending was obtained by cutting sheets off the mill roll until a uniform viscosity is achieved. The powdered ingredients were then added over the polymer bank and dispersed therein by cutting and cross-blending. The curatives are then added and the composition was cut and cross-blended to obtain thorough and uniform dispersion of all ingredients. The resulting material was cooled in the air, compound tested then used as the surface material for a fuser roll. The components can also be mixed with an internal mixer device known in the trade as a Banbury. When the fuser roller material is formed using a liquid state composition, the components can be effectively prepared by "in-situ" mixing techniques. In-situ mixing involves dissolving the polymer in a solvent, then adding the powdered ingredients including the activator and curatives. In compositions having a tendency to gel rapidly, it is preferable to employ a two or three component system to isolate the calcium hydroxide and/or the acceptor.

In compounding or formulating fluorocarbon elastomers, metal oxides are conventionally added to act as an acid acceptor, cure activator, reinforcent filler and/or at times as an additive to promote improved chemical resistance. The use of lead oxide, for example, improves the steam and acid resistance of fluoroelastomer compounds and is well known in the art. Metal fillers are also added to provide actual release by interaction with mercapto functional compounds. However, it has been determined that metal and metal oxide free compositions provide advantages as a top coat surface in a fuser roll despite the diminished mechanical properties.

TABLE II

| | Fuser Roll Surface Material Compositions | | | | | | |
|---|---|---|---|---|---|---|---|
| | COMPARISON METAL OXIDE CONTAING FLUOROELASTOMER COMPOSITION | | | | | METAL OXIDE FREE FLUOROELASTOMER | |
| Composition | A | B | C | D | E | F | G |
| Fluorel 2530 (copolymer of VF$_2$ and HFP) | x | x | x | x | 100 | 100 | x |
| L12176 (copolymer VF$_2$ and HFP) | x | x | x | x | x | x | 100 |
| Terpolymer VF$_2$ HFP & TPE | 100 | x | x | x | x | x | x |
| Copolymer VF$_2$ & TPE | x | 100 | x | 100 | x | x | x |
| Terpolymer VF$_2$, HFP & TPE & Cure Site Monomer | x | x | 100 | x | x | x | x |
| Cupric Oxide | x | x | 15 | 15 | x | x | x |
| Lead Oxide | 15 | 15 | x | x | x | x | x |
| Magnesium Oxide | x | x | 2.0 | 3 | 3 | x | x |
| Calcium Hydroxide | x | x | 1.0 | 6 | 6 | x | x |
| Curative 20 | 2.5 | 1.4 | x | 1.4 | x | x | x |
| Curative 30 | 3.5 | 2.8 | x | 2.0 | x | x | x |

TABLE II-continued

| | Fuser Roll Surface Material Compositions | | | | | | |
|---|---|---|---|---|---|---|---|
| | COMPARISON METAL OXIDE CONTAING FLUOROELASTOMER COMPOSITION | | | | | METAL OXIDE FREE FLUOROELASTOMER | |
| Composition | A | B | C | D | E | F | G |
| Curative 50 | x | x | 5.0 | x | x | x | x |
| DIAK No. 3 | x | x | x | x | x | 6.0 | 6.0 |
| Polymer Data | Terpolymer of $VF_2$ HFP & TPE | Copolymer of $VF_2$ & HFP | Tetrapolymer of $VF_2$, HFP, TPE & cure site monomer | Copolymer of $VF_2$ & HFP | Copolymer of $VF_2$ and HFP | Copolymer of $VF_2$ and HFP | Copolymer of $VF_2$ and HFP |
| Total Fluorine (wt. %) | 68.5 | 66% | 69.0% | 66% | 69.6% | 69.6% | 70 |
| HFP Content (molar %) | 18 | 21 | 22 | 21 | 37 | 37 | 44 |
| $VF_2$ Content (molar %) | 61 | 79 | 55 | 79 | 63 | 63 | 56 |
| TFE Content (molar %) | 21 | x | 23 | x | x | x | x |
| $VF_2$/HFP Ratio (molar) | 3.39 | 3.76 | 2.5 | 3.76 | 1.70 | 1.70 | 1.27 |

| INGREDIENT DATA | | |
|---|---|---|
| CHEMICAL COMPOSITION | TRADE NAME | MANU-FACTURER |
| Terpolymer of $VF_2$, HFP & TPE with 68.5% flourine | Viton B-50, Fluorel, FT 2430 | DuPont, 3M |
| Copolymer of $VF_2$ and HFP with 65.9% fluorine | Viton E-45, Fluorel, FC 2145 | DuPont, 3M |
| Copolymer of $VF_2$, HFP with 66% fluorine | Viton E-60, Fluorel, FC 2230 | DuPont, 3M |
| Tetrapolymer of $FV_2$ and HFP TFE and cure site monomer with 69% fluorine | Viton GF, Fluorel, FLS 2690 | DuPont, 3M |
| Copolymer of $VF_2$ and HFP containing phosphonium salt accelerator and bisphenol crosslinker with 69.6% fluorine | FC 2530 | 3M |
| 33% dispersion of organophosphonium salt in Viton E-45 | Curative 20 | DuPont |
| 50% dispersion of bisphenol (dihyroxy aromatic compound) in Viton E-45 | Curative 30 | DuPont |
| Proprietary accelerator and bisphenol curative system | Curative 50 | DuPont |
| Copolymer of $VF_2$ and HFP containing phosphonium salt accelerator and bisphenol crosslinker with 70% fluorine | L-12176 | 3M |
| N, N'-Di-cinnamylidene-1, 6, hexanediamine | DIAK No. 3 | DuPont |

Fuser roll samples were formed by covering a 1.5 inch standard aluminum insert with a 4 mil thick fluoroelastomer base coat covered with a 2 mil thick topcoat of the materials shown below in Table III. The sample fuser rolls were prepared by first mixing the base coat material and topcoat material in a two roll mixing mill. The base coat compound was formulated by combining 100 parts VITON E-60 (DuPont) fluoroelastomer, 30 parts thermal carbon black filler, 12 parts magnesium oxide (as an activator/acid accepter) and 5.5 parts blend CURATIVE 20 (DuPont) and CURATIVE 30 (DuPont).

The mixed starting materials were dissolved in a 50:50 blend of methyl ethyl ketone (MEK) and methyl isobutyl ketone (MIBK) solvents to approximately a 15% solid concentration. The aluminum insert was precured with a primer layer of THIXON 300/301 adhesive and then sprayed with the base coat solution to a thickness of about 5–6 mils. The coated sample was maintained at room temperature to permit residual solvent to evaporate and then cured in a circulating oven for up to 24 hours at a temperature of 150° to 450° F. The sample was then ground to a base coat thickness of 3–4 mils. After washing the sample with solvent, it was over sprayed with a 15% solid topcoat solution to yield a coating having a thickness of 4 to 5 mils. Residual solvent was permitted to evaporate and the sample was subjected to final curing in a hot air circulating oven for up to 24 hours at 450° F. The topcoat was then ground to a thickness of 2 to 3 mils.

Fusing tests herein were carried out by passing an 8.5× 11.5 inch 75 g/m² sheet of paper having toner particles thereon between fuser roll 20 and pressure roll 30 to fuse toner 12 to paper 13. Fuser roll life is indicated by the number of sheets of paper that can be successfully fused before failure by either offset, mechanical failure or some other difficulty. Fuser rolls including metal free compositions F and G from Table II were found to be acceptable.

The above procedure was followed for each of the following Runs 1–5, except that the topcoat composition was changed as set forth in Table III and the insert was a standard two inch insert. Fuser roll samples produced from Runs 1, 2, 3 and 5 were installed and tested in a Xerox 1065 copier. The results of each copy life test are shown in Table IV, which demonstrates the advantages of a high fluorine content and metal oxide free fluoroelastomer composition for fusing application.

TABLE III

| FORMULATION OF TOPCOAT COMPOSITION | | | | | |
|---|---|---|---|---|---|
| | RUN NUMBERS | | | | |
| INGREDIENTS | 1 | 2 | 3 | 4 | 5 |
| FC 2145 (66% F) | 100 | x | x | 100 | x |
| L 12176 (70% F) | x | 100 | 100 | x | 100 |
| MAGNESIUM OXIDE | 2 | 2 | 2 | x | x |
| CALCIUM HYDROXIDE | 4 | 4 | 4 | X | x |
| DIAK No. 3 | x | x | x | 6 | 6 |
| CURATIVE 20 | 1.4 | x | x | x | x |
| CURATIVE 30 | 2.8 | x | x | x | x |

TABLE III-continued

FORMULATION OF TOPCOAT COMPOSITION

| INGREDIENTS | RUN NUMBERS | | | | |
|---|---|---|---|---|---|
| | 1 | 2 | 3 | 4 | 5 |

FC 2145 - Copolymer of VF$_2$ and HFP containing 66% total fluorine by weight and a VF$_2$/HFP molar ratio of 3.76
FC 2530 - Copolymer of VF$_2$ and HFP containing 69% total fluorine by weight and a VF$_2$/HFP molar ratio of 1.70; contains phosphonium salt accelerator and bisphenol crosslinker.
L12176 - Copolymer of VF$_2$ and HFP containing 70% total fluorine by weight and a VF$_2$/HFP molar ratio of 1.27; contains phosphonium salt accelerator and bisphenol crosslinker.
DIAK NO. 3 - N, N$^1$ -Di-cinnamylidene - 1, 6 Hexanediamine
CURATIVE 20 - 33% dispersion of organophophonium salt in Viton E45
CURATIVE 30 - 50% dispersion of bisphenol (dihydroxy aromatic compound) in Viton E45

A comparison was made in Table IV below between fuser rolls having the compositions of Runs 1, 2, 3 and 5.

TABLE IV

| Material Description Run # | Roll Life Type Release Agent Non-Functional Polydimethysiloxane |
|---|---|
| 1 - 66% F with metal oxide | 6,000 |
| 2 - 69% F with metal oxide | 12,000 |
| 3 - 70% F with metal oxide | 21,000 |
| 5 - 70% F no metal oxide | 115,000 |

By comparing Examples 1 and 2, it can be seen that including a high HFP percentage is associated with 100% increase in roll life. Example 3 having 70% F shows a 75% increase in roll life compared to Example 2 and a 250% increase over Example 1 with 66% F. However, the most dramatic results can be seen by comparing Examples 3 and 5. The elimination of metal oxide within the fuser roll surface material led to a 450% increase in roll life of 94,000 copies. Accordingly, it is preferred to provide a fuser roll without any metal oxide in the material.

During conventional cross-linking, metal oxides are used to generate unsaturation in the polymer material. However, the reaction is generally not easy to control and accordingly, it is has been common to employ excess metal oxides to achieve acceptable results. However, this typically generates excess unsaturation. The unsaturation in the cured polymer material increases the surface energy and may decrease fuser roll life before offset occurs. The metal particles at the roll surface also increase the surface energy.

It has been discovered that by carefully controlling the curing of metal-oxide free polymer material, sufficient cross-linking is achieved to cure the polymer and also provide acceptable mechanical properties, without creating excessive unsaturation and without any residual material to increase the surface energy of the fuser roll. Metal free compositions in accordance with the invention include sufficient sites for cross-linking, but not excessive sites which would oxidize, thereby increasing surface energy and impede toner release. Furthermore, without residual metal oxide particles, the composition will inherently yield a polymer surface having lower surface energy particularly well suited for fusing applications.

EXAMPLE 2

A fuser roll is prepared in accordance with Example 1, employing L-12176 as the surface material, which is sprayed onto a procured base layer having a 4 mil thickness. The surface material is air dried and then positioned in an electron beam apparatus curing device and exposed to an energy dose of 15 MRad. The resultant fuser roll will perform acceptably with polydimethylsiloxane release fluid having a viscosity of about 500 CSTKS and will exhibit excellent roll life and release properties, including adequate release at a temperature of about 185° C.

EXAMPLE 3

A fuser roll is prepared as in Example 2, except that the top coat material is formed of 100 parts L-12176 together with five parts EBECRYL 3700. EBECRYL 3700 (available from RADCURE of Louisville Ky.) is a conventional metal-oxide free cross-linking aid (co-agent) that has been found to improve the efficiency of electrons beam cures. The roll is cured with an electron beam dosage of about 5 MRad's and will perform similarly to the roll of Example 2.

EXAMPLE 4

Curing without metal oxides can also be effected by treatment with a base in either the vapor or liquid phase. For example, ammonia, methylamine, ethylamine and dimethylamine gas can be passed over a fuser roll coated with metal oxide free fluoroelastomer material. The base will attack the polymer chain and create unsaturated sites for cross-linking. Subsequent heat treatment will cure the material and provide a fuser roll surface having exceptional release properties that does not require interaction with a mercapto functional release agent.

Base treatment as described herein can also be accomplished in the liquid phase. The above-noted gaseous materials can be solved in a suitable solvent, such as ether or alcohols and the uncured fuser roll can be completely immersed therein. Propyl and butyl amines can also be employed, as well as combinations of the above bases.

EXAMPLE 5

A fuser roll is prepared as in Example 1, except that the surface layer is formed of L-12176 which is sprayed onto the precured base layer. The surface material is air dried and placed in a cylindrical stainless steel chamber equipped with a gas inlet and exhaust apparatus. A gaseous mixture of 5% anhydrous ammonia and 95% N$_2$ (by volume) is allowed to flow over the roll surface until sufficient unsaturation is developed as can be evidenced by a change in surface color or through instrumental analysis. The roll is then removed and placed in a forced air oven at a temperature of about 200° C. for about 24 hours. It will perform well with a polydimethylsiloxane release fluid having a viscosity of 500 CSTK at surface temperatures of about 185° C.

EXAMPLE 6

A fuser roll is prepared as in Example 1, except that the surface layer is formed of Fluorel 2530 which is sprayed onto a precured base layer. The Fluorel layer is air dried and then placed in a cylindrical steel chamber equipped with gas inlets and outlets. A gaseous mixture of 5% anhydrous ammonia and 95% N$_2$ (by volume) is allowed to flow over the roll surface. The roll is then removed and placed in a forced air oven at 200° C. for 24 hours. The roll will exhibit adequate release with a 500 CSTK linear reactive polydimethylsilicone fluid copolymer containing 0.1 wt % mercaptopropylmethylsiloxane modification at temperatures of

EXAMPLE 7

A fuser roll is prepared as in Example 1, except that the surface layer is formed of L-12176. The material is cured by immersing the fuser roll in a 10 wt % solution of butylamine in diethylether at 25° C. until surface discoloration is apparent. The roll is then removed from the amine-ether solution and washed with ethyl alcohol and distilled water. It is then heat treated at 200° C. for 24 hours. The roll will exhibit adequate release properties at temperatures of about 85° C. with a 500 CSTK liner polysiloxane release fluid.

It will thus be seen that the objects set forth above, among those made apparent from the preceding description, are efficiently attained and, since certain changes may be made in carrying out the above method, and in the composition and article set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

Particularly it is to be understood that in said claims, ingredients or compounds recited in the singular are intended to include compatible mixtures of such ingredients wherever the sense permits.

What is claimed is:

1. A fusing member for fixing toner particles to a recording medium, comprising a substrate and an outer layer of fluoroelastomer material on the substrate, the outer layer of fluoroelastomer material being a polymer including vinylidene fluoride and at least about 23.4 mole percent hexafluoropropylene and cured without the addition of metal containing material.

2. The fusing member of claim 1, wherein the member is a fuser roll.

3. The fusing member of claim 1, wherein the fluoroelastomer includes at least about 30 mole percent hexafluoropropylene.

4. The fusing member of claim 2, wherein the fluoroelastomer is a copolymer of hexafluoropropylene (HFP) and vinylidene fluoride ($VF_2$).

5. The fusing member of claim 4, wherein the molar ratio of $VF_2$ to HFP is less than 2.

6. The fusing member of claim 1, wherein the substrate is in the form of a metal core having a layer of silicone material including metal oxide material therein, disposed on the metal core.

7. The fusing member of claim 6, including a tie coat of fluoroelastomer material between the surface layer and the silicone material.

8. A fusing system for fusing toner to a recording medium, comprising a fuser roll having an outer surface formed of fluoroelastomer material including vinylidene fluoride and at least about 23.4 mole percent hexafluoropropylene cured without metal containing material and a polysiloxane release agent fluid disposed on the surface of the fuser roll, the release agent substantially free of mercapto functional compounds.

9. The fusing system of claim 8, wherein the fluoroelastomer includes at least 23.4 mole percent hexafluoropropylene.

10. The fusing system of claim 8, wherein the fluoroelastomer includes at least 70% by weight fluorine.

* * * * *